United States Patent
Sumner et al.

(10) Patent No.: US 9,519,988 B2
(45) Date of Patent: Dec. 13, 2016

(54) SUBSPACE CLOTHING SIMULATION USING ADAPTIVE BASES

(71) Applicant: PIXAR, Emeryville, CA (US)

(72) Inventors: Robert Sumner, Zurich (CH); Fabian Hahn, Sprietenbach (CH); Bernhard Thomaszewski, Zurich (CH); Stelian Coros, Zurich (CH); Forrester Cole, Berkeley, CA (US); Mark Meyer, San Francisco, CA (US); Anthony Derose, San Rafael, CA (US); Markus Gross, Uster (CH)

(73) Assignees: PIXAR, Emeryville, CA (US); ETH ZÜRICH, Zürich (CH); Disney Enterprises, Inc., Burbank, CA (US)

( * ) Notice: Subject to any disclaimer, the term of this patent is extended or adjusted under 35 U.S.C. 154(b) by 112 days.

(21) Appl. No.: 14/502,388

(22) Filed: Sep. 30, 2014

(65) Prior Publication Data
US 2016/0093084 A1    Mar. 31, 2016

(51) Int. Cl.
*G06T 13/40* (2011.01)

(52) U.S. Cl.
CPC ........... *G06T 13/40* (2013.01); *G06T 2210/16* (2013.01)

(58) Field of Classification Search
None
See application file for complete search history.

(56) References Cited

U.S. PATENT DOCUMENTS

| 2004/0001064 A1* | 1/2004 | Boyd | G06T 13/40 345/473 |
| 2011/0273457 A1* | 11/2011 | De Aguiar | G06T 13/20 345/474 |

OTHER PUBLICATIONS

Hahn, F. et al., 2014. Subspace Clothing Simulation Using Adaptive Bases. ACM Trans. Graph. 33, 4, (Jul. 2014), 105:1-105:9.
Harmon, D., and Zorin, D. 2013. Subspace integration with local deformations. ACM Trans. Graph. 32, 4 (Jul. 2013), 107:1-107:10.
Kavan, L., Gerszewski, D., Bargteil, A. W., and Sloan, P.-P. 2011. Physics-inspired upsampling for cloth simulation in games. ACM Trans. Graph. 30, 4 (Jul. 2011), 93:1-93:10.
Wang, H., Hecht, F., Ramamoorthi, R., and O'Brien, J. F. 2010. Example-based wrinkle synthesis for clothing animation. ACM Trans. Graph. 29, 4 (Jul. 2010), 107:1-107:8.
Zurdo, J. S., Brito, J. P., and Otaduy, M. A. 2013. Animating wrinkles by example on non-skinned cloth. IEEE Trans. Vis. Comput. Graph. 19, 1 (Jan. 2013), 149-158.

* cited by examiner

*Primary Examiner* — Ryan M Gray
(74) *Attorney, Agent, or Firm* — Kilpatrick Townsend & Stockton LLP

(57) ABSTRACT

A method of animation of surface deformation and wrinkling, such as on clothing, uses low-dimensional linear subspaces with temporally adapted bases to reduce computation. Full space simulation training data is used to construct a pool of low-dimensional bases across a pose space. For simulation, sets of basis vectors are selected based on the current pose of the character and the state of its clothing, using an adaptive scheme. Modifying the surface configuration comprises solving reduced system matrices with respect to the subspace of the adapted basis.

20 Claims, 15 Drawing Sheets

SUBSPACE CLOTHING SIMULATION USING ADAPTIVE BASES

FIELD

The present disclosure relates to computer animation in general and in particular to computer animation of deformable surfaces, e.g., clothing. Other, non-limiting examples of deformable surfaces include sheets on a bed and surface geographical strata over a shifting earth.

BACKGROUND

A goal of computer-generated graphics and animations is increased realism, especially of characters. Characters, especially human characters, are often animated wearing snugly fitting clothing, which would physically stretch and form wrinkles in response to body motions. Animating such deformations may be computationally intensive, as a mesh (the vertices and connecting edges) for animating the clothing can be quite large, and the physical effects of a garment's motion are not necessarily localized. For example, raising an arm inside a sweater can cause a wrinkle across the entire front of the sweater.

Simulating a single image of deformations of cloth, especially clothing on a character, at high levels of realism and detail can be performed, but with high computational cost. The level of detail required to achieve realism may entail very large systems of equations resulting from the size of a mesh that models the clothing or surface. Generating animations of a moving character would entail even greater computational costs.

Methods and systems are needed that reduce the computational time and costs of producing animation data for deformable surfaces, such as clothing overlaying an animated character, while maintaining high levels of realism.

BRIEF SUMMARY

Embodiments of the present invention include methods and systems for generating animation data to show configurations of a deformable surface. A configuration of the deformable surface can be calculated for each of a plurality of training poses of an object underlying the deformable surface, such as an animated character being the object and the deformable surface being clothing. In some embodiments configurations can be calculated for training poses using a complete system of physical equations, as discussed below. The training poses and associated deformable surface configurations can be clustered into a plurality of clusters by one of various cluster analysis methods. One or more representative poses for the clusters may also be determined, e.g., as a local subspace basis. Thereafter, when a new pose is received, clusters neighboring the new pose can be identified, and the local subspace bases of the neighboring cluster(s) can be used to construct an adapted basis. The adapted basis is used to form a reduced system of equations to use to determine the configuration of the deformable surface for the new pose.

In some embodiments, within each cluster the associated configuration can be further organized, for example by a principle component analysis (PCA) or other dimension reduction analysis performed on the associated configurations. A local basis of vectors for the cluster can be chosen according to decision criteria. For example, modes produced by a PCA can be chosen on the basis of significance. Data corresponding to the clusters, such as configurations, representative poses and local bases, may be organized into a Pose Space Database (PSDB) for use in determining configurations of the deformable corresponding to other poses.

As part of calculating configurations of the deformable surface corresponding to training poses, a kinematic model may be used that aligns the data for surface with corresponding data of the training pose. The training pose may serve as a reference or approximation for where the surface could be. A physical simulation may then be used to solve for offsets training pose. A physical model of the deformable surface that represents how a deformation in the surface result in internal forces that resist the deformation may be used in a simulation. These forces have to be accounted for when finding a solution to Newton's equations of motion, in order to determine the configuration of the deformable surface for the new pose. One way to account for the forces is to reformulate the problem as an energy minimization task. In this approach, the task is to find the configuration of the deformable surface that minimizes an energy function. The energy function has as inputs configurations of the deformable surface. As part of the minimization, a gradient of the energy function may be calculated. As the deformable surface can be described by a very large number of variables, the resulting set of equations for minimizing the energy function can be a very large system. A simulation using the entire large system is called a full space simulation. A full space simulation is used with the training poses to determine corresponding configurations of the surface.

The PSDB may be used to generate animation data for at least one image of the deformable surface on the underlying object having a pose not in the PSDB. The pose may be part of a sequence of poses for which an animation is to be produced. Given one such pose, a distance from the pose to each of the clusters can be determined, and only clusters within a chosen distance may be selected for use in the data generation. The local basis vectors of the selected clusters can be used as a pool from which to form an adapted basis for the pose. The adapted basis may be chosen from the pool based on the alignment of the vectors in the pool with the gradient of the energy function with respect to the all variables of the configuration of the surface.

A simulation can then be performed with respect to the adapted basis by forming a reduced system of equations in each iteration. The configuration of the surface for the pose is calculated within the subspace of spanned by the adapted basis. This is called a subspace simulation. The resulting surface configuration data can then be stored or otherwise made available for rendering an image of the surface.

Other embodiments are directed to systems and computer readable media associated with methods described herein.

The following detailed description together with the accompanying drawings will provide a better understanding of the nature and advantages of the present invention.

DETAILED DESCRIPTION OF THE EMBODIMENTS

Realistic computer-generated animations of characters often requires animation of the clothing worn by the animated characters, including animations of wrinkling and stretching as the character moves. Realistic animation of clothing contributes to the style and personality of the animated characters. The methods and systems will be described in relation to the particular example of generating animation of clothing on a character, but it will be apparent to one of skill in the art that the methods and systems may also be applied to other deformable surfaces on an underlying object.

An overall workflow for producing animation data may include: a data input stage, a training stage, a pose space database (PSDB) and local basis creation stage, and a subspace simulation stage that generates animation data for given poses. In the data input stage, existing information regarding the animation to be performed is received in a computer or computing system. In the training stage, full space simulation results can be produced. In the PSDB creation stage, results of the training stage may be clustered and a local basis for each cluster determined. The simulation stage then may use the clusters and local bases during subspace simulations of clothing configurations, and the configurations may be used to generate animation data. Once generated, the animation data may be used by a renderer to create animation images.

Each of these stages is explained in more detail below. Section I describes an exemplary method using these stages with respect to FIG. 1. The sections thereafter describe in further detail each of the stages. Particular embodiments may include one or more of these stages. Particular embodiments may receive results of one or more stages and perform the operations of other stages. In one embodiment, results of a training stage may be performed by a first system, and the results may then be included in the data inputs to a second system that performs the PSDB and local basis creation stage and the simulation stage. In a another embodiment, a system may receive as input data from a first system the PSDB and local bases for the clusters, and the system performs one or more simulations for an animation.

I. DESCRIPTION OF AN EXEMPLARY METHOD

Figure 1:
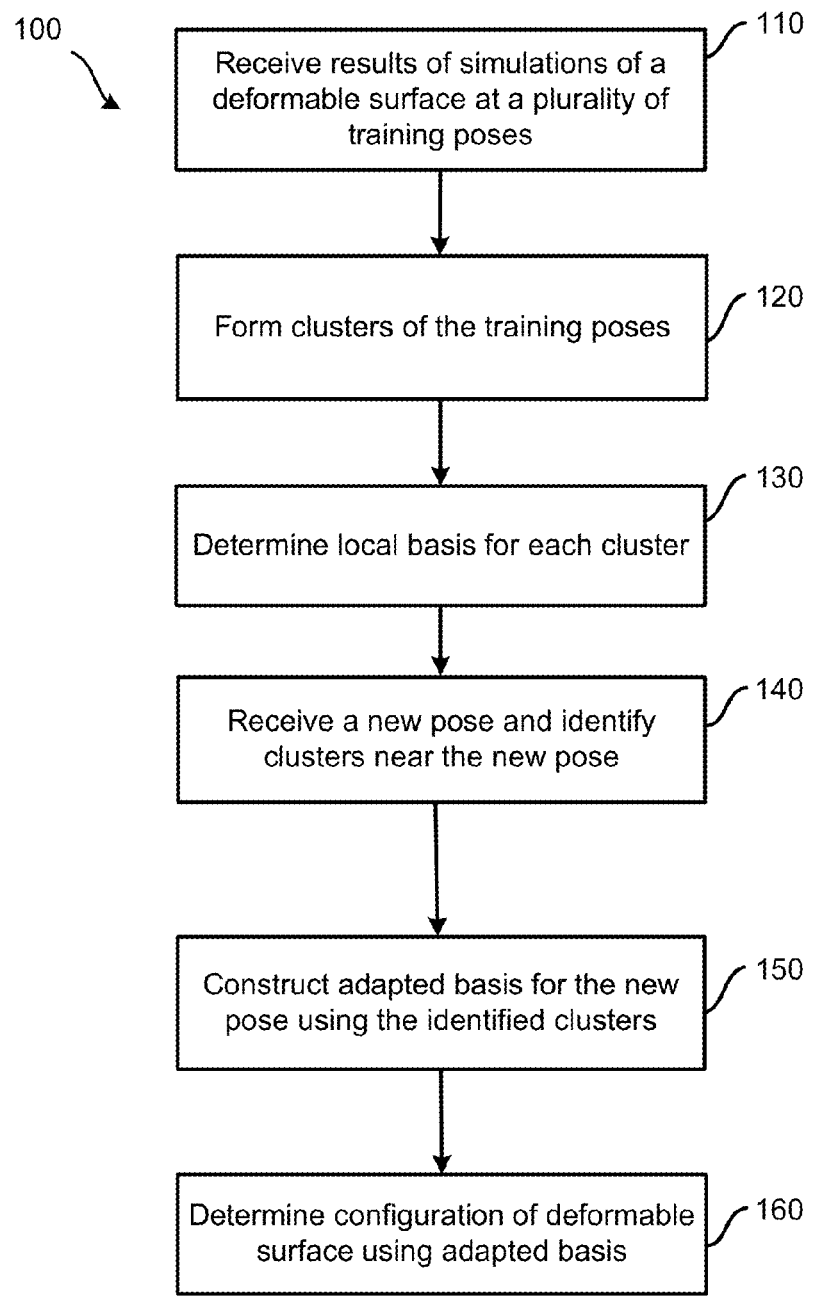
FIG. 1 is a flowchart of a method of generating animation data for a deformable surface, according to an embodiment.

FIG. 1 is a flow chart for an embodiment of a method 100 to generate animation data that makes use of the stages just described. FIG. 1 presents an overview of actions of the method; further details of various embodiments of each of the stages in FIG. 1 are presented below. The method of FIG. 1 may be implemented in a computer system, for example as a specific instruction set stored in the memory of a general purpose computer system, or as a special purpose computing system. Details regarding computer implementations are given below in relation to FIGS. 10 and 11.

At block 110, the results of simulations of a deformable surface at a plurality of training poses of an object are received. The deformable surface may be in close superficial contact with, or proximity to, the object. In one embodiment, for each simulation, the results comprise a configuration of the deformable surface. A configuration can specify positions of a plurality of locations on the deformable surface. Other information may be included in a configuration, such as velocities and/or accelerations of locations on the deformable surface, or normal vectors at locations on the surface. The training poses may comprise information regarding the shape and locations of an object underlying the surface. In one implementation, the underlying object may be an animated character, and the deformable surface may be clothing on the animated character. Each training pose may give rise to one or more configurations of the surface. For example, a particular pose might arise in two different training sequences of poses, and in each sequence a different configuration of the surface could be produced by a simulation for the pose. Thus, the particular configuration could be dependent on a previous pose.

At block 120, the training poses are formed into clusters, using a clustering algorithm. Examples of such clustering algorithms include the k-means, mean-shift, and expectation-maximization algorithms. The clusters may be based on a defined distance between poses. The distance between poses may be defined by the mean square norm between vectors for the locations of the respective poses.

At block 130, for each cluster a local basis for the configurations of the surfaces of the poses of the cluster is determined. The local basis may be determined by using Principle Component Analysis (PCA). Alternative methods, such as Gram-Schmidt orthogonalization or factor analysis, may be used to determine the local basis.

At block 140, a new pose of the underlying object is received for which a corresponding configuration of the surface is to be determined. The new pose is compared to the poses of the clusters, and those clusters whose poses are determined to be near to the new pose are identified.

At block 150, an adapted basis for the new pose is selected from among the local bases of the identified clusters. Configurations from the local bases can be selected for inclusion in the adapted basis for the new pose based on the value of the projection of the configuration onto a gradient of a kinematic model for the surface. The gradient itself may also be included in the adapted basis.

At block 160, a simulation is performed using the adapted basis to determine a new configuration of the surface corresponding to the new pose. The simulation may compute the new configuration by restricting the kinematic model for the surface to the subspace formed by the adapted basis. The results of the simulation can then be used by a renderer to generate an image.

Each of the operations of the blocks of method 100 can have various implementations, as detailed in the following sections.

II. DATA INPUTS AND PRELIMINARY OPERATIONS

This section describes various data and data structures that can be received by a computer for use in determining the configuration of the surface. The computer itself or another computer system may have created some or all of the data or data structures prior to performing the operations described below.

A. Received Data

At the data input stage, a computer can receive various forms of data as inputs. The data inputs establish the basic animation to be created, for example, a sweater on a torso. The data may include any of the results of the blocks 110-140 in method 100. The data inputs may be implemented using any of various data structures known to those of skill in the art, such as databases, or as arrays, structures, classes in the C++ computer language. Other programming languages or methods may also be used to implement the embodiments.

Some embodiments receive as an input a data structure termed a linear blend skinning (LBS) rig or another articulation system that is capable of producing an altered or deformed character data given pose descriptors. The description that follows refers to an LBS rig for convenience, but it will be clear to one skill in the art that the methods and systems may be used with such alternative articulation systems. Examples of such alternative articulation systems include cage-based deformers, wire deformation systems, and pose-space deformation. An LBS rig may include a skeleton of bones of an animation character, an undeformed surface mesh for the animation character, and a set of skinning weights. The bones of the skeleton may be represented as pairs of locations of endpoints of the bones. In alternative embodiments, the LBS skeleton may comprise a set of joint locations between bones. Still other representations of the skeleton may be used. The coordinates for the bone endpoints (or alternatively the joint locations) may be relative to a local origin for the character, or to a world coordinate system of the scene to be animated. One particular arrangement or configuration of the elements of the skeleton of an LBS may be designated as a neutral pose $\bar{p}$ of the character. Further details for poses of the LBS skeleton are explained in more detail below.

The surface mesh for the character in the LBS comprises multiple polygons, each comprising vertices and edges between pairs of vertices. In the general case of a deformable, the vertices represent points on the surface to be animated. The vertices may be located either with respect to a local coordinate system of the character or a global coordinate system of the scene to be animated. The undeformed surface mesh for the character is the surface mesh corresponding to the neutral pose $\bar{p}$. In some implementations of an LBS, each vertex in the surface mesh is associated with a set of bones in the neutral pose that are responsible for changing the vertex's location as the configuration of the bones change. Each vertex is also associated with a set of skinning weights $\omega_i^j$ that provide relative significance in a calculation of how the $i^{th}$ vertex is influenced by a configuration change for the $j^{th}$ bone.

Other data inputs may include configuration data of clothing to be appear on the character; the with clothing configuration data being with respect to the neutral pose of the character. In some embodiments, the clothing configuration data may comprise a clothing mesh of vertices and edges, the vertices representing points on the clothing. The clothing configuration data may also comprise other information, such as positions of the vertices of the clothing with respect to a world coordinate system, or with respect to the surface mesh for the character. The configuration of the clothing may be pre-positioned with respect to the neutral pose of the character. In one exemplary implementation, an animation of a shirt on a human torso used a clothing mesh comprising 29,510 vertices, arranged into 58,660 triangles. The clothing configuration data may also comprise other data, such as how much an edge of the clothing mesh can stretch during an animation.

Associated with each configuration of the skeleton of the LBS is a pose p comprising at least data for the configuration of the bones (or joints) of the skeleton. As known to those of skill in the art, a pose may comprise other data, such as velocities of the bones, and may be implemented in any of various ways. In one implementation, the pose data includes a vector j holding the angle values between two bones forming a joint.

B. Kinematic Model for Clothing Mesh

In some embodiments a surface mesh for an underlying object can be used to generate a mesh for the deformable surface. A specific example is now described in which the underlying object is an animation character, and the deformable surface is a close-fitting garment. Data for the surface mesh of the animation character can be used to create or modify the clothing mesh. In an exemplary embodiment, from the neutral pose of the character, for each vertex of the pre-positioned clothing mesh, the closest point on the surface mesh of the character is determined. Other criteria can be used to create the clothing mesh, or to correlate the clothing mesh with the animation character's surface mesh. The LBS rig allows for deforming the clothing mesh from its neutral pose in response to the character being in another pose p. The LBS rig may also be adapted as part of a kinematic model that aligns the clothing mesh with the current state of the character. The location of the $i^{th}$ vertex $X_i$ in the clothing mesh for the pose p is found in terms of the vertex's location $\bar{X}_i$ with respect to the neutral pose $\bar{p}$. The transformation is given by:

$$X_i(p) = \varphi_{LBS}(p, \bar{X})_i = \sum_j \omega_i^j T_j^T(p) \bar{X}_i \qquad (1)$$

where $T_j(p)$ is the transformation matrix of the bone (or joint) j for the current pose p, and $\omega_i^j$ are the skinning weights corresponding to the surface mesh.

III. TRAINING STAGE

In the training stage, simulations are performed to determine the configuration of clothing on an animation character using one or more training poses of the character. The training poses may be extracted from frames of animations of the character. The simulations are performed using complete data, such as the complete meshes, of the clothing and the training poses. As these simulations can be time-consuming and numerically intensive, these simulations may be performed before performing other subsequent simulations for producing animation data. The training poses may be representative of the various poses that are expected during the subsequent animations. The simulation results can then be used to enable more rapid simulations of the subsequent animations.

Figure 2A:
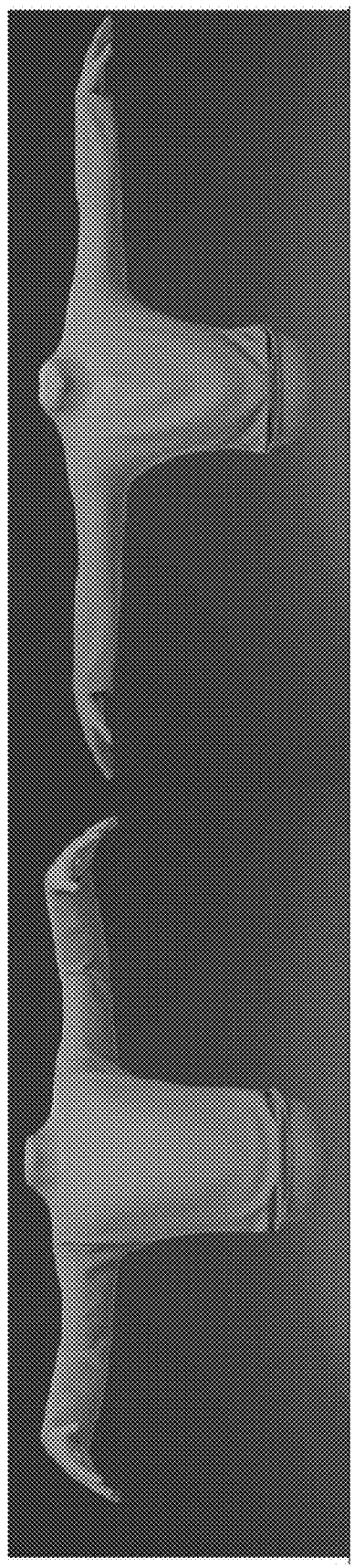
FIGS. 2A-2C show rendered images of full space clothing simulations on training poses from frames of animations, according to an embodiment.
Figure 2B:
Figure 2C:

FIGS. 2A-2C show frames of three exemplary animation sequences used in a training stage, in one embodiment. The figures show the animation character in a variety of training poses, with the clothing, in this example a close-fitting sweater, configured as a result of training stage simulations.

A. Full Space Clothing Simulations of Training Poses

In preferred embodiments, for each frame of a training animation a configuration of the clothing mesh corresponding to the pose p in the frame is sought. The physical simulation method is a variational formulation of an implicit Euler scheme. In some embodiments the time steps of the simulation are smaller than the time steps of the frames of the animation. In these embodiments the method seeks to find a solution for the full space clothing mesh $x_{t+1}$ that minimizes the objective function:

$$H(x_{t+1}) = \frac{1}{2}a_{t+1}^T M a_{t+1} + hW(x_{t+1}) \quad (2)$$

where $x_{t+1}$ denotes end-of-time-step positions of the vertices of the clothing mesh, h is the time step, M is the diagonal mass matrix and $$a_{t+1} = \frac{1}{h^2}(x_{t+1} - 2x_t + x_{t-1})$$

are nodal accelerations. The potential energy is given by $W = W_{el} + W_{ext}$, where $W_{el}$ is an elastic deformation due to cloth deformations, and $W_{ext}$ is an external energy due to gravity. In other embodiments, other contributions to the potential energy may be used, such as from forces due to breezes, or snags. Other physical simulation methods than implicit Euler schemes may be used, but the formulation of the objective function would be different.

During a full space simulation, each component of the vector $x_{t+1}$ is not a priori restricted and can be varied over the full vector space during the simulation. The objective function in (2) is then directly minimized for each time step. Equation (2) provides a consistent formulation for both full space simulations of training animations, and for the reduced space simulations described below.

Additional and/or alternative embodiments may use constant strain triangles for stretching and hinge elements for bending. Also, additional and/or alternative embodiments may use axis-aligned bounding boxes for collision detection and a combination of spring-like penalty forces and velocity filtering for collision response.

B. Results of Simulations of Training Poses

The full space simulations of the training poses produce at least the configurations (e.g., clothing configurations) associated to underlying poses. A particular pose may have associated with it more than one configuration of the clothing, as that pose may occur more than once in the training simulations, but the clothing configurations may be different at each occurrence of the pose due to the history of the clothing's motion during the simulations. For example, this may be the case when the poses arise from the same animation run at different speeds. Simple motions such as bending and straightening an arm will generally lead to different clothing configurations due to collisions, friction and the overall nonlinear nature of clothing.

IV. POSE SPACE DATABASE CONSTRUCTION

For the results of the full space simulations of the training poses to be useful for generating animation data, they must be organized for efficient recall and use in other simulations. An approach used by embodiments makes use of the observation that clothing on a character has a great deal of structure, e.g. components of the clothing mesh are not completely independent of each other for similar poses.

Figure 3:
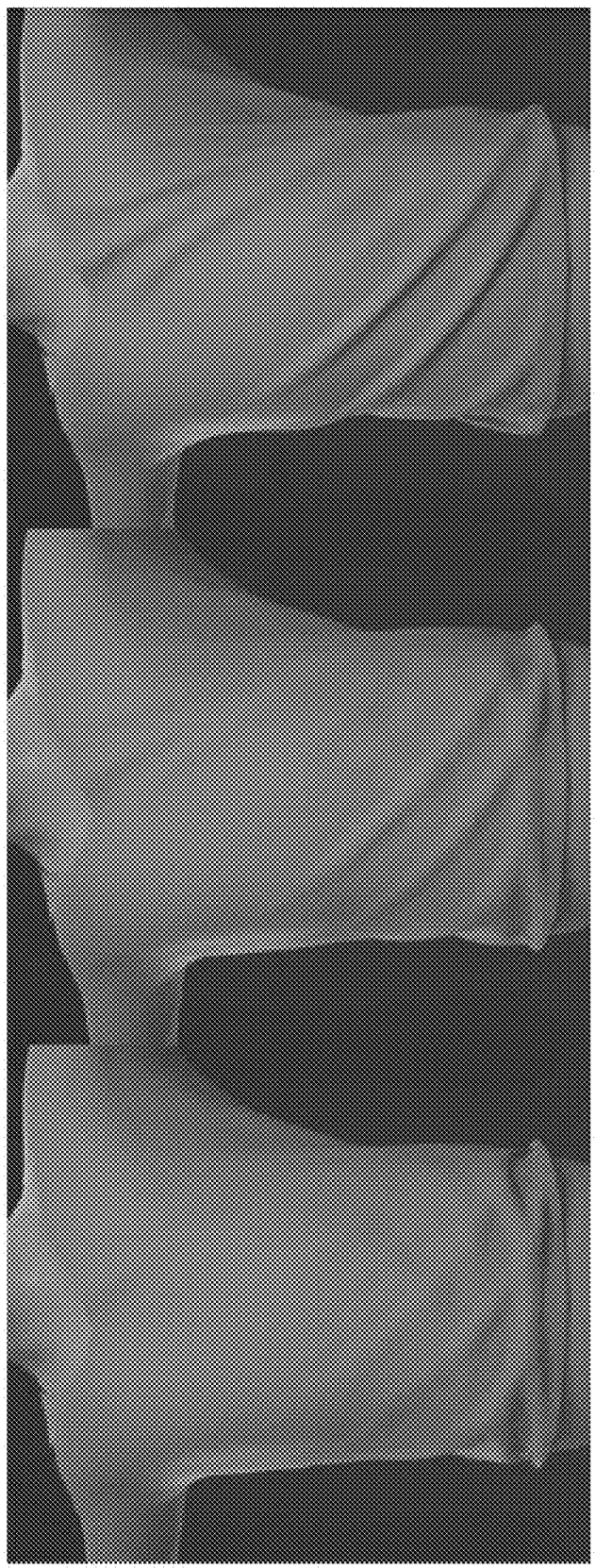
FIG. 3 shows rendered images of a clothing simulation performed using a fixed global basis to render all clothing deformations.

FIG. 3 illustrates a problem with an alternate approach to organizing and reducing the results of the full space simulations of the training poses. The approach does not perform the initial clustering of the training poses, but instead performs a Principle Component Analysis (PCA) or other dimension reduction analysis on all training poses, and produces a single global fixed basis of the most significant modes. The number of modes can be limited to produce a low-dimensional basis for use in clothing simulations for new poses. These clothing simulations can be performed for the new poses by restricting the simulation to the subspace spanned by the fixed basis. It has been observed that this approach can correctly reproduce clothing deformations for many individual poses, but as part of an animation sequence the clothing deformations may jump nonsmoothly between configurations, which is illustrated in FIG. 3. The three frames were captured within a short duration of 0.12 seconds in a single animation.

The limitations of the alternate approach just described suggests that at least around a single pose the local space of deformations of the surface can be adequately represented by a low-dimensional subspace of configurations. This motivates adopting an adaptive, pose-dependent approach for the clothing simulations.

A. Clustering of Training Poses and Clothing Configurations

Figure 4:
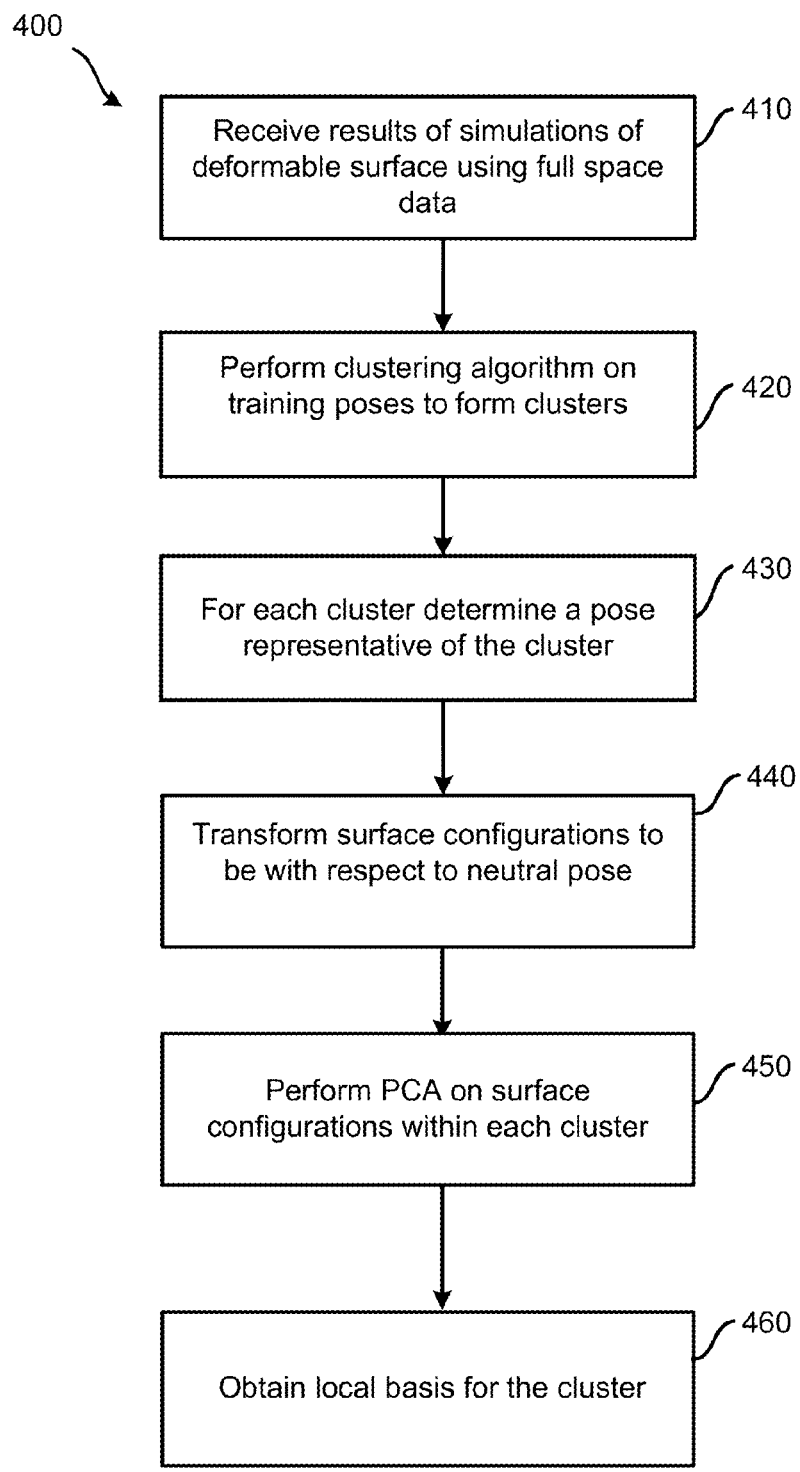
FIG. 4 is a flowchart of a method of generating a Pose Space Data Base, according to an embodiment.

FIG. 4 is a flow chart for a process 400 of creating a Pose Space Data Base according to embodiments of the present invention. The stages of process 400 are embodiments for performing the operations of blocks 120 and 130 discussed previously.

The process 400 starts at block 410 by receiving the results of the full space simulations of the training poses. These may have been performed at previous times or by different systems and stored for use. There may be a relatively limited number of such full space simulations performed compared to a number of desired new simulations since full space simulations of training poses can involve very large systems of equations for each frame of an animation. The training poses may be chosen to cover a representative set of poses that are similar to poses that are likely to be encountered in new animations.

At block 420, a clustering algorithm is performed on the training poses. A preliminary step in clustering is to define a distance between two poses. Embodiments may use induced difference geometry of the corresponding surface meshes of the two poses. Then the $L^2$ distance (mean square) is used as the distance between two poses. Each pose can be specified as a multidimensional point in space by having each variable of the pose be a dimension. The distance between two poses can be calculated as the distance between the corresponding multidimensional points. A cluster analysis can arrange the set of all training poses into a disjoint union of subsets, called clusters, using a distance metric, e.g., the $L^2$ distance. In one embodiment, a k-means cluster analysis is used, producing k clusters. Other cluster analysis algorithms that may be used include mean-shift, expectation-maximization, OPTICs, or other clustering algorithms known to one of skill in the art.

At block 430, for each cluster, a representative pose for the cluster may be chosen; e.g. if the k-means clustering algorithm is used, a mean (average) representative pose is produced for each cluster as part of the algorithm. Other methods may be used to determine the representative pose for the cluster. The representative pose chosen for a cluster need not be a pose of the cluster, but, e.g., may represent a mean of the poses of the cluster.

B. Local Basis Selection within Clusters

At block 440, once the clusters have been determined, for each cluster, the surface configurations associated to the poses of the cluster are transformed to be with respect to a common reference for comparison so that a basis can be selected that represents the clothing configurations. Recall, in the example of the surface being clothing, that each such configuration comprises a vector x of positions for the clothing mesh, or an equivalent representation. The vector x may be very high dimensional, and may include the overall motion of the animation character. However, what matters more for comparing clothing meshes are their shapes relative to the kinematics model results of equation (1). For this reason, the state of the kinematic model X(p) of equation (1), where p is the pose of the clothing mesh, is subtracted to obtain a world-space displacement vector u(p)=x−X(p). This displacement vector is then transformed back to the neutral pose $\bar{p}$ of the animation character by applying the inverse LBS transformation: $\bar{u}=\phi_{LBS}^{-1}(u)$. Note that the function $\phi$ in equation (1) is a function of the single variable p for a fixed value of $\overline{X}$ corresponding a fixed value of $\bar{p}$.

At block 450, a PCA or another dimension reduction analysis is performed on the transformed surface configurations, for example, the clothing meshes. The modes returned by the PCA may be truncated either by selecting the first d-many, for d a pre-chosen number, when the modes are ranked by singular value, or by selecting those modes having a ratio of corresponding singular value to the largest singular value above a threshold value $\epsilon_{PCA}$. In one application $\epsilon_{PCA}$=0.01 was chosen. The first truncation process ensures that the bases for each cluster contain the same number of basis vectors, whereas the second ensures the local basis vectors are significant. Other truncation criteria may be used.

At block 460, the truncated set of modes can form a local basis that can represent the configurations of the cluster. Because of the truncation of the modes returned by the PCA, local basis need not span the set of all configurations of the cluster; in some embodiments the span of the local basis may provide approximations to the configurations of the cluster.

Figure 5A:
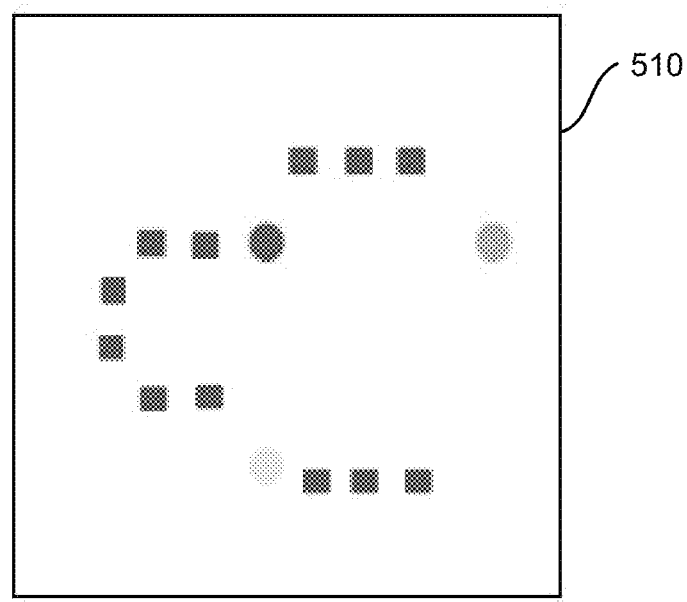
FIG. 5A shows an exemplary special case of a clustering, as may be used by an embodiment.
Figure 5A:
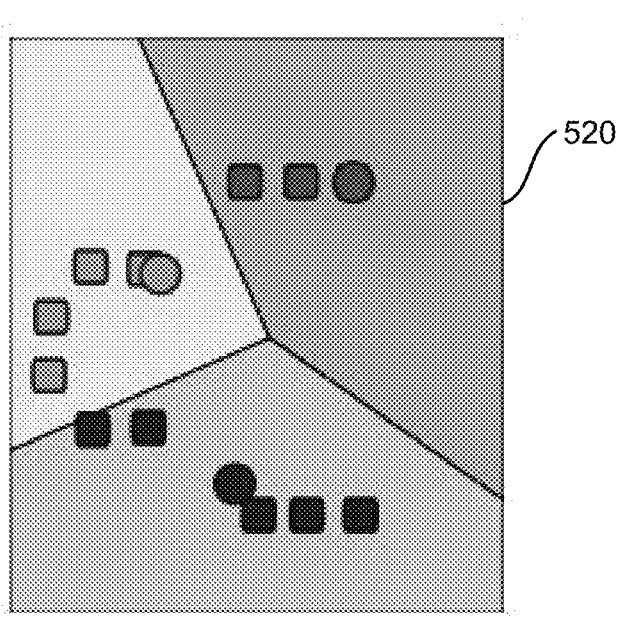

FIG. 5A is a simplified example showing the principle of clustering. In this case the k-means algorithm is applied to a set of 2-dimensional vectors shown as squares in 510. An initial set of k=3 means, shown as circles, is chosen. Initial clusters are created by associating every vector (square) with its nearest mean. Then the centroid of each cluster is becomes a new mean. The process is repeated until the means converge. The result is illustrated in 520, in which 3 clusters with corresponding centroids have been created. The centroids can be used as the vector representative of the cluster.

Figure 5B:
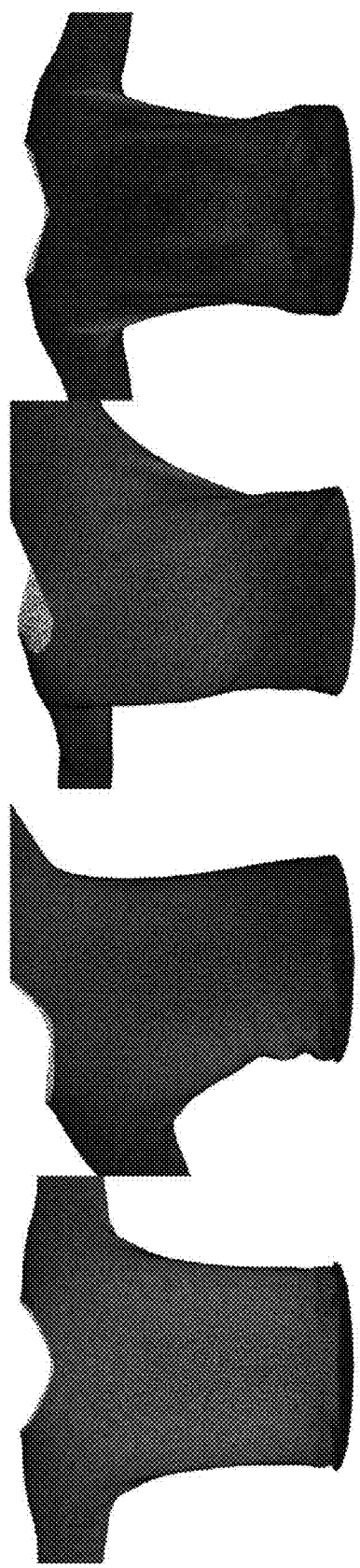
FIG. 5B shows a visualization of four basis vectors from four sites in a Pose Space Date Base, according to an embodiment.

FIG. 5B illustrates four clothing mesh basis vectors selected from within clusters of four training poses. The color intensity indicates the relative amount by which regions on the shirt move when the respective basis vector is excited. Dark indicates no motion, whereas bright (light) indicates strong motion.

Once a local basis for each cluster is determined, the clusters together the corresponding local bases are formed into a Pose Space Database (PSDB). As described in next section, the PSDB is used to supply a pool of candidate vectors for an adapted basis for a pose that occurs during a simulation and which may not be in the PSDB.

V. SUBSPACE CLOTHING SIMULATION

Once created, the PSDB can be used in methods for generating animation data of new poses different from the poses from the training animations for which full space simulations were performed. Simulations for the new poses can be performed by restricting the simulations to adapted local bases for each new pose, chosen using the PSDB. Such restriction of the simulations can produce a much smaller system of equations, leading to much faster simulations and consequent determination of the configuration of a deformable surface in general, or of clothing in a specific application.

A. Subspace Simulation Algorithm

Recall that when the objective function of equation (2) is used as part of a full space simulation, a very large system of equations results when implementing the implicit Euler scheme due to the size of the vertex position vector x. Embodiments reduce the size of the system of equations needed to determine the clothing configuration by reducing the full space problem to finding a solution of a reduced linear system in a subspace.

Figure 7:
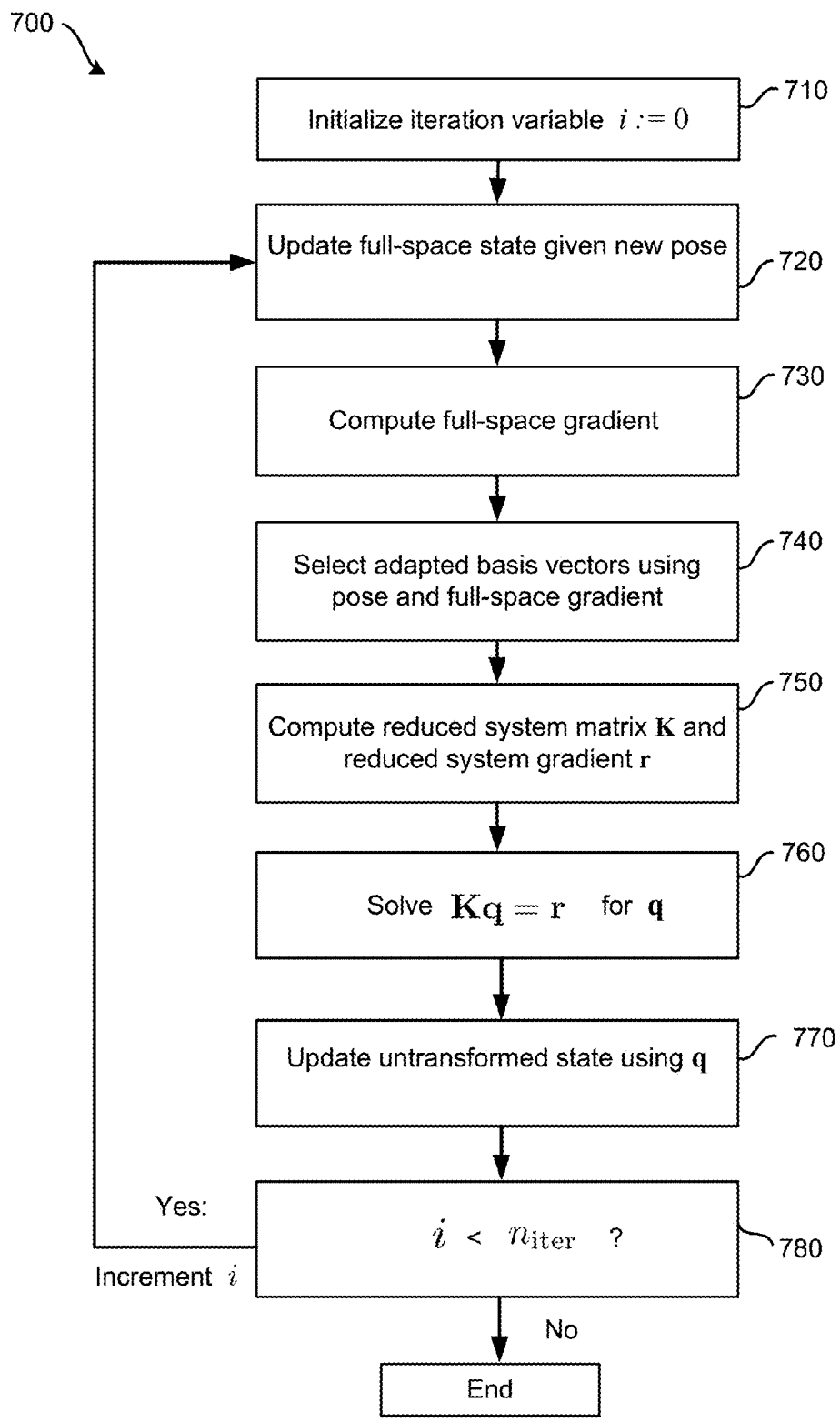
FIG. 7 is a flowchart for simulating clothing deformations, according to an embodiment.

FIG. 7 is a flow chart for an exemplary method 700 of simulating the clothing configurations using the constructed PSDB for an input animation by using adaptively chosen subspaces for the new poses p from the animation. Newton's method or another minimization process may be used to minimize the objective function in (2) but only over a subspace adapted for each of the new poses.

At block 710, a looping operation is initiated over the frames of the animation. There are $n_{iter}$ frames in the animation.

At block 720, for the LBS transformations are used to update the full space state for a new pose p. This is performed by computing the clothing configuration x by $$x = \phi(p;\overline{X}) \qquad (3)$$

Then at block 730, the gradient g for the over the full space is calculated using the kinematic model given by equation (1). The function in (1) is not linear with respect to the poses p but is linear with respect to position $\overline{X}_i$. Differentiating in (1) with respect to $\overline{X}_i$ gives its full space Jacobian B:

$$B = \frac{\partial \varphi_{LBS}}{\partial \overline{X}_i} \qquad (4)$$

This becomes a block-diagonal matrix with 3×3 sub-blocks given by $$B_i \sum_j \omega_i^j \cdot T_j^T. \qquad (5)$$

At block 740 an adapted basis for a subspace depending on p is selected; in one embodiment the selection uses the process 600 given by the flow chart in FIG. 6 and described below. The adapted basis can be determined using distances from p to the clusters, and by values of projections of the local bases of selected clusters onto the full space system gradient. From the adapted basis a matrix A is formed whose columns correspond to the adapted basis vectors. The matrix A can implement a projection into the subspace spanned by the adapted basis vectors.

Displacements of the clothing surface can at this stage be determined with respect to the subspace. That is, the displacements with respect to the subspace are determined by u(q)=Aq, for q the unknown coefficients with the respect to the adapted basis vectors. The displacement u(q) is related to the deformed configuration of the surface x by $$x(p,q) = \phi_{LBS}(p; X + Aq) \quad (6)$$

where X is the state of the kinematic model of equation (1).

At block 750 the method 700 continues by computing the reduced system Hessian K and the reduced system gradient r. The reduced system Hessian K and the reduced gradient r are obtained by using (6) with (1) and differentiating with respect to q. First note that by using (4) and the chain rule, the Jacobian, J, of (6) with respect to q is given by:

$$J = \frac{\partial x}{\partial q} = BA \quad (7)$$

The reduced gradient and the Hessian of (1) are then respectively given by:

$$r = J^T M a + \frac{\partial W}{\partial x} \quad (8)$$

and $$K = J^T \frac{1}{h^2} M a + \frac{\partial^2 W}{\partial x^2} J \quad (9)$$

At block 760, the method 700 continues with K and by solving the reduced system:

$$Kq = r, \quad (10)$$

for the unknown reduced coordinates q with respect to the adapted basis.

The resulting system of equations is dense, but is only of dimension r×r instead of n×n for a full space variant. In the example case of the sweater, the dimension of the reduced space was r=12, while the system for the full space clothing simulation had on the order of n=80,000 degrees of freedom. In many implementations of the method, the cost of solving the reduced system was reduced to a point that system assembly then become a significant fraction of the overall computation time.

At block 770, the solution for q is used to update the untransformed state. This is performed by updating x by x=x+AQ.

At block 780, the method 700 is checked to determine if the iteration limit is reached. If so the method ends, otherwise the iteration continues by updating the iteration variable and repeating. method 700 for a new pose.

B. Adapted Basis Selection

Figure 6:
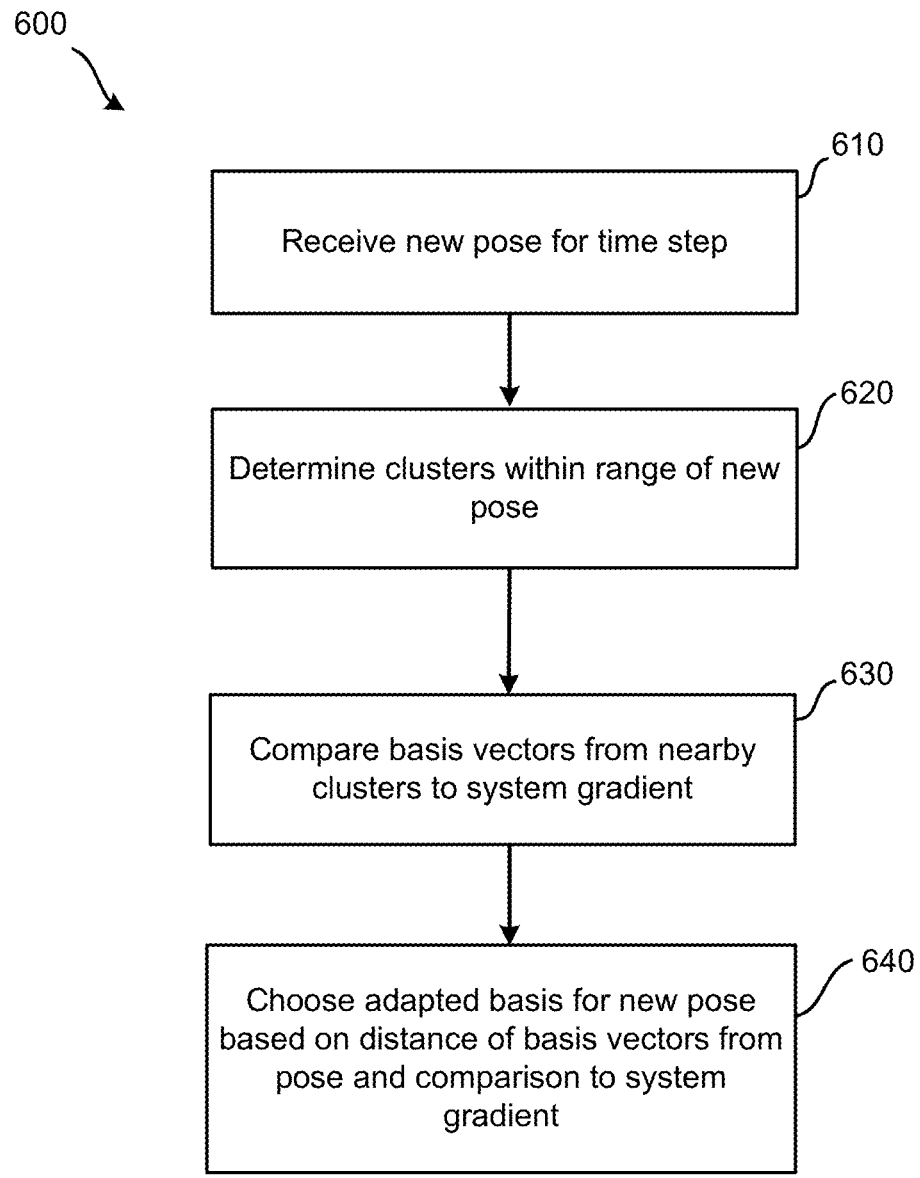
FIG. 6 is a flowchart of a method of selecting an adaptively chosen basis for a pose, according to an embodiment.

FIG. 6 is a flow chart for a method 600 for the block 740. In block 610, the pose p is received as an input for block 620. The distance from p to each of the clusters in the PSDB is determined, as described above. A cluster in the PSDB is selected for use if its distance from p is within a chosen limit, or if the clusters are within the support of a kernel function φ(p) centered at p. Other decision criteria can be used to select clusters given the pose p. The vectors of the local bases of the selected clusters are used as a pool from which the adapted basis is chosen.

The pool may be larger than necessary so at least two criteria may be used to weight the vectors of the pool. A first criterion is to use how well a vector aligns with the gradient g at the current configuration, as determined at block 730. For an arbitrary vector v to be a descent direction for the objective function of equation (2), the dot product of v with g must be positive. Otherwise v would not help in solving the full space problem. So the vectors of the pool are first scored based on the value of their dot product with g.

A second criterion for ranking the elements of the pool is to give preference to vectors from clusters closer to the current pose. The score determined by the dot product with g can be scaled according to the distance of the vector to p. In one embodiment the scaling is by the inverse of the distance. Once the scores are scaled the scores are sorted, with those vectors with scores above a chosen threshold selected for inclusion in the adapted basis for p. Other selection criteria applied to the sorted scores may also be used be used, such as selecting a chosen number of vectors. The vectors for the adapted basis for p may then be formed into a basis matrix A whose columns are the vectors of the adapted basis.

C. Solver Optimizations

Modifications for efficiency of the subspace simulation algorithm have been found by experimentation. The full space Hessian may be used, without updating or redetermination, over many time steps. Performing only one Newton step may be chosen as a default. Only if the norm of the current adapted basis vectors projected onto the full space gradient is above a threshold σ=0.1 is the Hessian recomputed and further steps performed.

D. Modifications of the Adapted Basis

Modifications for efficiency may also be realized by incorporating the full space gradient to the adapted basis. This ensures that the solution of the subspace problem will always reduce the objective function (2), and at the same time enlarges the range of possible deformations.

Figure 8:
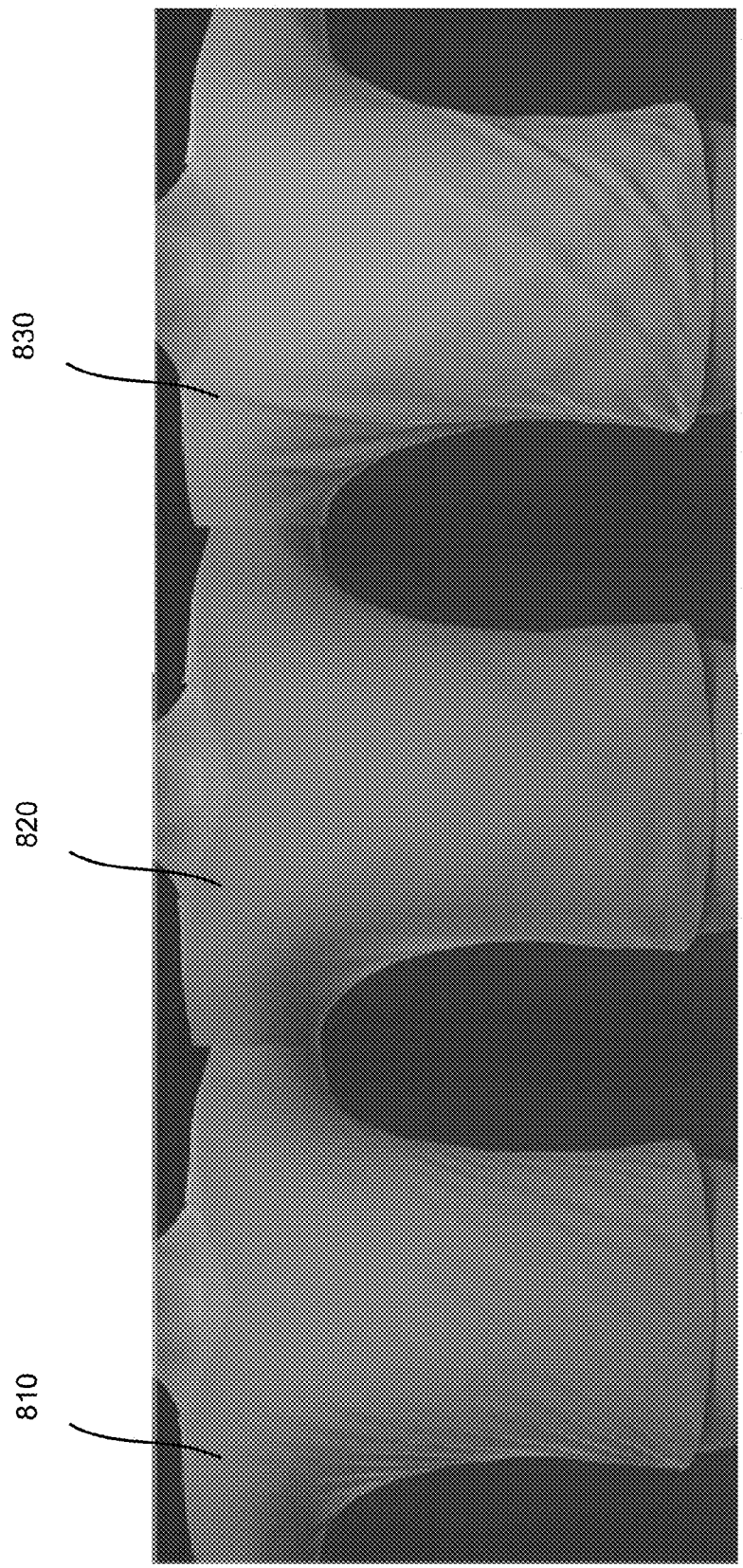
FIG. 8 shows rendered images formed using different bases selection processes, according to various embodiments.

FIG. 8 illustrates three different simulations of the same pose using different adapted basis formation rules. The shirt in 810 was simulated using only the full space gradient as the adapted basis. The shirt in 820 was simulated using the adapted basis selection process of method 700 but without adding the gradient to the adapted basis, and 830 was simulated using the adapted basis used 820 but with the gradient added.

The approach taken in the method of FIG. 7 is to update the full space configuration x with the subspace displacements Aq in each iteration of the algorithm. The full space configuration is generally not in the span of the current subspace basis. Due to the large range of deformations observed in clothing, restricting the full space solution in this way would not typically allow the same degree of variability in clothing shape to be obtained. When the adapted basis changes in every iteration, it is not is not possible to change the component of the current state that is not in the span of the current basis. To address this, the difference vector $\bar{x} - \bar{X}$ is added to the basis, allowing the clothing to undo the solution of the previous step, if necessary.

E. Simulation Results

Figure 9A:
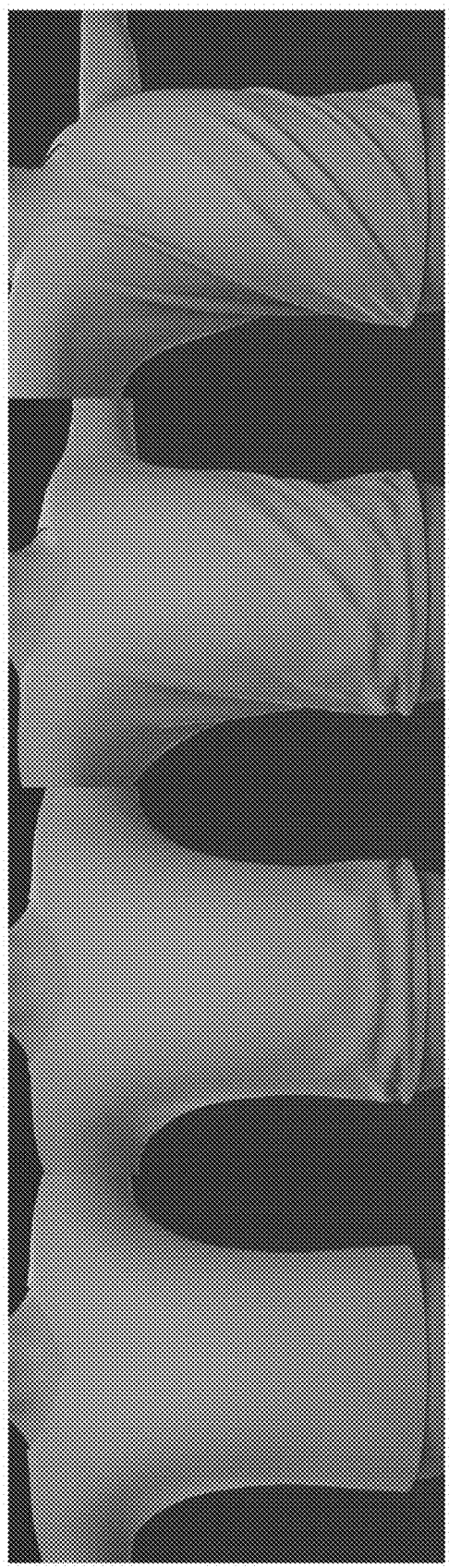
FIGS. 9A-9B show rendered images of clothing simulations performed with adaptively chosen basis vectors, according to an embodiment.
Figure 9B:
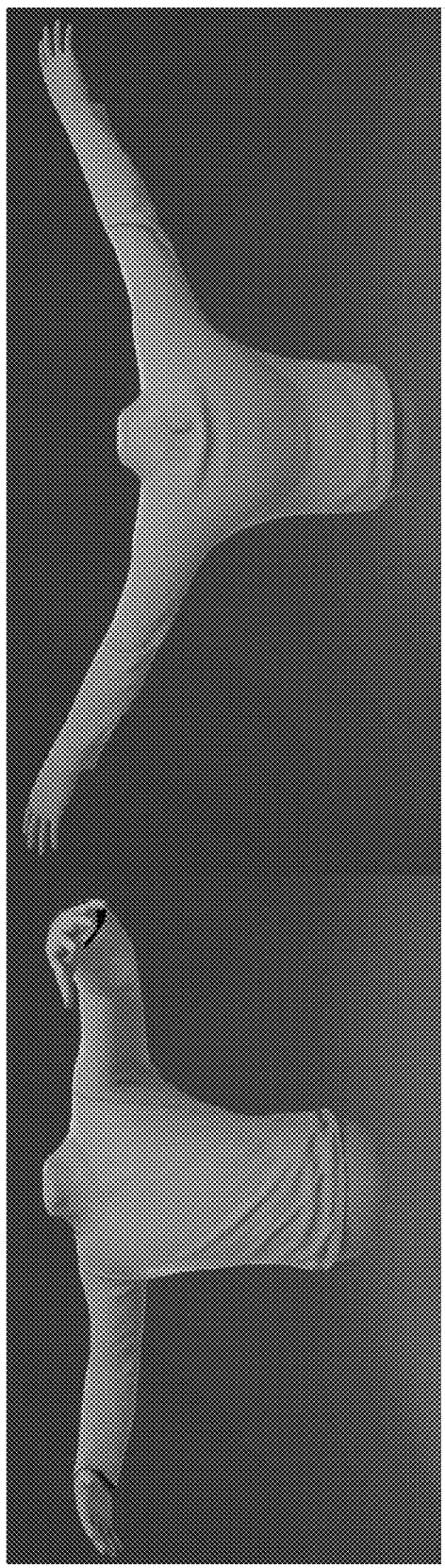

FIGS. 9A and 9B show results of simulating new poses based on the training animations of FIGS. 2A-2C. The clothing mesh comprised 29,510 vertices and 58,660 triangles. The training animations of FIGS. 2A-2C generated approximately 10,000 frames, and a like number of poses. From these training poses a PSDB was created with 18 clusters and with 10 to 20 local basis vectors each. Using the subspace simulation method produced runtime speedups up to 22 times faster over a full space simulation method.

VI. COMPUTER IMPLEMENTATIONS

A. General Computer System

Figure 10:
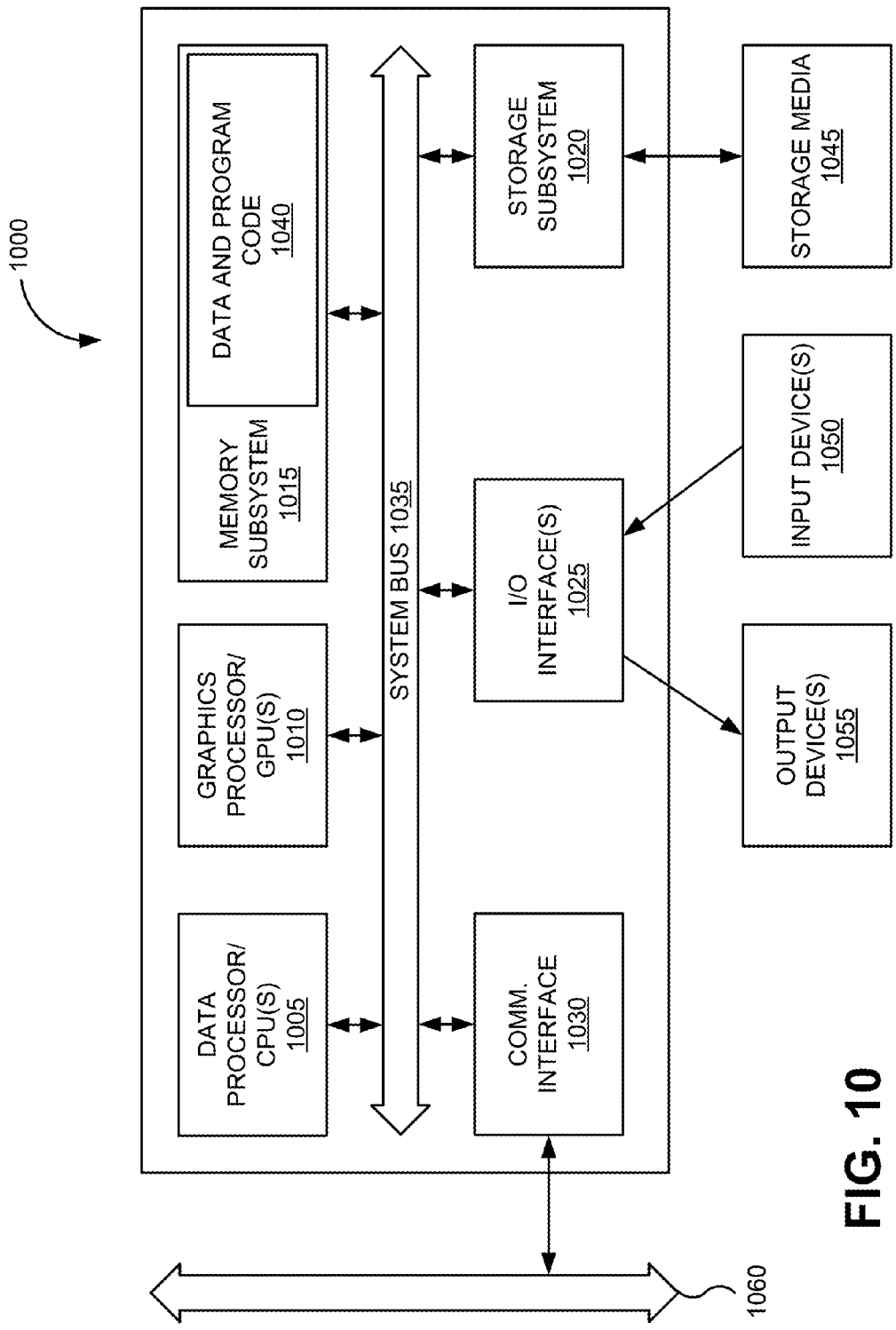
FIG. 10 is block diagram of a computer system capable of implementing an embodiment.

FIG. 10 is a block diagram of computer system 1000. FIG. 10 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 1000 and any of its components or subsystems can include hardware and/or software elements configured for performing methods described herein.

Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 can execute logic or program code or for providing application-specific functionality. Some examples of CPU(s) 1005 can include one or more microprocessors (e.g., single core and multi-core) or micro-controllers, one or more field-gate programmable arrays (FPGAs), and application-specific integrated circuits (ASICs). As user herein, a processor includes a multi-core processor on a same integrated chip, or multiple processing units on a single circuit board or networked.

The one or more graphics processor or graphical processing units (GPUs) 1010 can execute logic or program code associated with graphics or for providing graphics-specific functionality. GPUs 1010 may include any conventional graphics processing unit, such as those provided by conventional video cards. In various embodiments, GPUs 1010 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1010 may include any number of registers, logic units, arithmetic units, caches, memory interfaces, or the like.

Memory subsystem 1015 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 1015 can include data and program code 1040.

Storage subsystem 1020 can also store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of data and program code 1040 may be stored using storage subsystem 1020.

The one or more input/output (I/O) interfaces 1025 can perform I/O operations. One or more input devices 1050 and/or one or more output devices 1055 may be communicatively coupled to the one or more I/O interfaces 1025. The one or more input devices 1050 can receive information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can output information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements. A display device or monitor may be used with computer system 1000 and can include hardware and/or software elements configured for displaying information.

Communications interface 1030 can perform communications operations, including sending and receiving data. Some examples of communications interface 1030 may include a network communications interface (e.g. Ethernet, Wi-Fi, etc.). For example, communications interface 1030 may be coupled to communications network/external bus 1060, such as a computer network, a USB hub, or the like. A computer system can include a plurality of the same components or subsystems, e.g., connected together by communications interface 1030 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 1000 may also include one or more applications (e.g., software components or functions) to be executed by a processor to execute, perform, or otherwise implement techniques disclosed herein. These applications may be embodied as data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

B. Computer Graphics System

Figure 11:
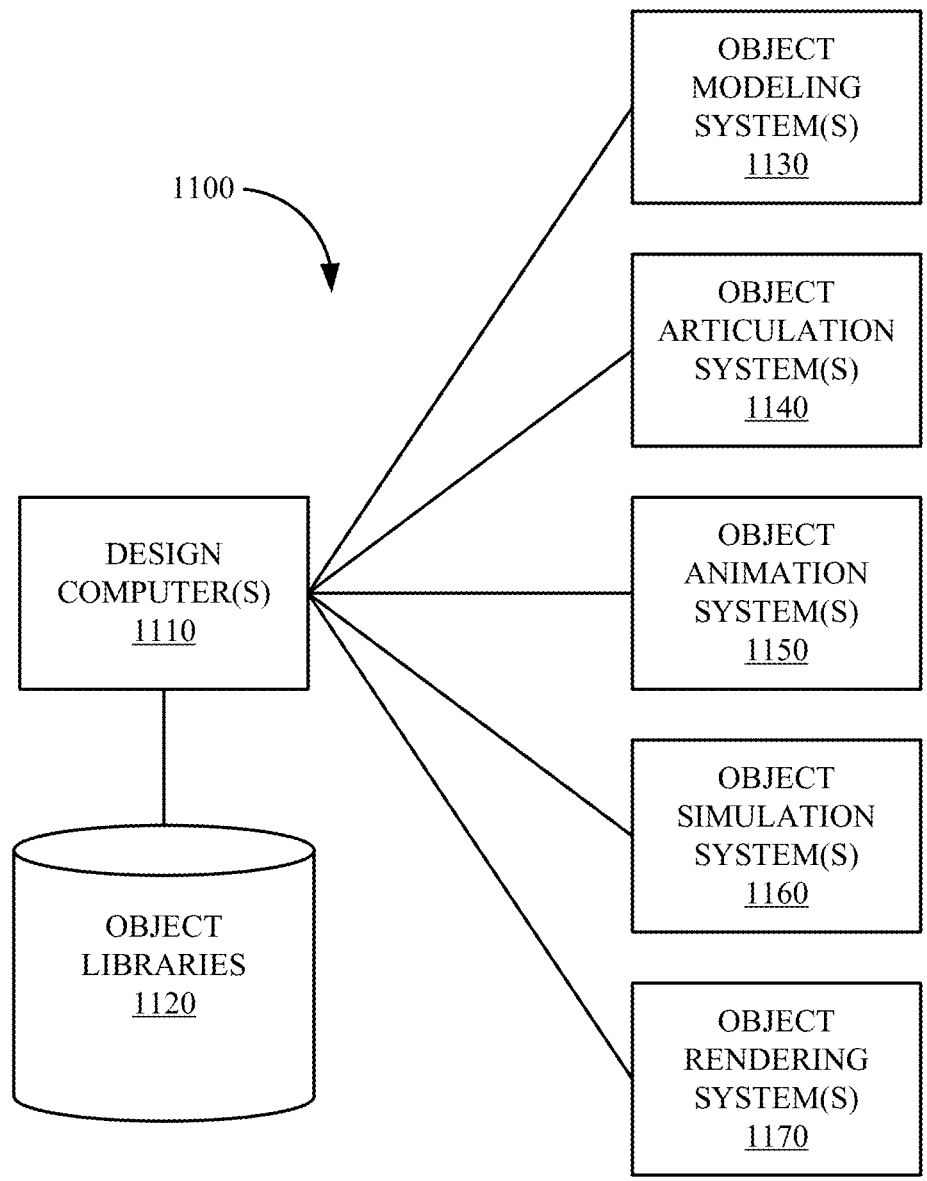
FIG. 11 is a block diagram of a computer graphics system for producing animations, capable of implementing an embodiment.

FIG. 11 is a simplified block diagram of system 1100 for creating computer graphics imagery (CGI) and computer-aided animation that may implement or incorporate various embodiments. In this example, system 1100 can include one or more design computers 1110, object library 1120, one or more object modeler systems 1130, one or more object articulation systems 1140, one or more object animation systems 1150, one or more object simulation systems 1160, and one or more object rendering systems 1170. Any of the systems 1130-1170 may be invoked by or used directly by a user of the one or more design computers 1110 and/or automatically invoked by or used by one or more processes associated with the one or more design computers 1110. Any of the elements of system 1100 can include hardware and/or software elements configured for specific functions.

The one or more design computers 1110 can include hardware and software elements configured for designing CGI and assisting with computer-aided animation. Each of the one or more design computers 1110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 1110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 1110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 1110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 1110 acting as an animator may employ one or more systems or tools to specify motion and position of one or more objects over time to produce an animation.

Object library 1120 can include elements configured for storing and accessing information related to objects used by the one or more design computers 1110 during the various stages of a production process to produce CGI and animation. Some examples of object library 1120 can include a file, a database, or other storage devices and mechanisms. Object library 1120 may be locally accessible to the one or more design computers 1110 or hosted by one or more external computer systems.

Some examples of information stored in object library 1120 can include an object itself, metadata, object geometry, object topology, rigging, control data, animation data, animation cues, simulation data, texture data, lighting data, shader code, or the like. An object stored in object library 1120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 1130 can include hardware and/or software elements configured for modeling one or more objects. Modeling can include the creating, sculpting, and editing of an object. In various embodiments, the one or more object modeling systems 1130 may be configured to generated a model to include a description of the shape of an object. The one or more object modeling systems 1130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 1130 may further generate model data (e.g., 2D and 3D model data) for use by other elements of system 1100 or that can be stored in object library 1120. The one or more object modeling systems 1130 may be configured to allow a user to associate additional information, metadata, color, lighting, rigging, controls, or the like, with all or a portion of the generated model data.

The one or more object articulation systems 1140 can include hardware and/or software elements configured to articulating one or more computer-generated objects. Articulation can include the building or creation of rigs, the rigging of an object, and the editing of rigging. In various embodiments, the one or more articulation systems 1140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 1140 may further generate articulation data (e.g., data associated with controls or animations variables) for use by other elements of system 1100 or that can be stored in object library 1120. The one or more object articulation systems 1140 may be configured to allow a user to associate additional information, metadata, color, lighting, rigging, controls, or the like, with all or a portion of the generated articulation data.

The one or more object animation systems 1150 can include hardware and/or software elements configured for animating one or more computer-generated objects. Animation can include the specification of motion and position of an object over time. The one or more object animation systems 1150 may be invoked by or used directly by a user of the one or more design computers 1110 and/or automatically invoked by or used by one or more processes associated with the one or more design computers 1110.

In various embodiments, the one or more animation systems 1150 may be configured to enable users to manipulate controls or animation variables or utilized character rigging to specify one or more key frames of animation sequence. The one or more animation systems 1150 generate intermediary frames based on the one or more key frames. In some embodiments, the one or more animation systems 1150 may be configured to enable users to specify animation cues, paths, or the like according to one or more predefined sequences. The one or more animation systems 1150 generate frames of the animation based on the animation cues or paths. In further embodiments, the one or more animation systems 1150 may be configured to enable users to define animations using one or more animation languages, morphs, deformations, or the like.

The one or more object animations systems 1150 may further generate animation data (e.g., inputs associated with controls or animations variables) for use by other elements of system 1100 or that can be stored in object library 1120. The one or more object animations systems 1150 may be configured to allow a user to associate additional information, metadata, color, lighting, rigging, controls, or the like, with all or a portion of the generated animation data.

The one or more object simulation systems 1160 can include hardware and/or software elements configured for simulating one or more computer-generated objects. Simulation can include determining motion and position of an object over time in response to one or more simulated forces or conditions. The one or more object simulation systems 1160 may be invoked by or used directly by a user of the one or more design computers 1110 and/or automatically invoked by or used by one or more processes associated with the one or more design computers 1110.

In various embodiments, the one or more object simulation systems 1160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 1160 may be used to simulate the behavior of objects, such as hair, fur, and cloth, in response to a physics model and/or animation of one or more characters and objects within a computer-generated scene.

The one or more object simulation systems 1160 may further generate simulation data (e.g., motion and position of an object over time) for use by other elements of system 1100 or that can be stored in object library 1120. The generated simulation data may be combined with or used in addition to animation data generated by the one or more object animation systems 1150. The one or more object simulation systems 1160 may be configured to allow a user to associate additional information, metadata, color, lighting, rigging, controls, or the like, with all or a portion of the generated simulation data.

The one or more object rendering systems 1170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 1170 may be invoked by or used directly by a user of the one or more design computers 1110 and/or automatically invoked by or used by one or more processes associated with the one or more design computers 1110. One example of a software program embodied as the one or more object rendering systems 1170 can include PhotoRealistic RenderMan, or PRMan, produced by Pixar Animations Studios of Emeryville, Calif.

In various embodiments, the one or more object rendering systems 1170 can be configured to render one or more objects to produce one or more computer-generated images or a set of images over time that provide an animation. The one or more object rendering systems 1170 may generate digital images or raster graphics images.

In various embodiments, a rendered image can be understood in terms of a number of visible features. Some examples of visible features that may be considered by the one or more object rendering systems 1170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 1170 may further render images (e.g., motion and position of an object over time) for use by other elements of system 1100 or that can be stored in object library 1120. The one or more object rendering systems 1170 may be configured to allow a user to associate additional information or metadata with all or a portion of the rendered image.

VII. CONCLUSION

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

A recitation of "a", "an" or "the" is intended to mean "one or more" unless specifically indicated to the contrary.

What is claimed is:

1. A method of generating animation data of deformable surface, the method comprising:
   receiving results of simulations of the deformable surface at a plurality of training poses, the results at a training pose comprising one or more configurations of the deformable surface, wherein a configuration specifies positions of a plurality of locations on the deformable surface;
   clustering the plurality of training poses into a plurality of clusters, each cluster comprising one or more of the plurality of training poses;
   for each cluster:
     determining one or more representative poses of the cluster; and
     determining a local basis for a subspace of the configurations associated with the cluster based on the one or more representative poses of the cluster;
   receiving a new pose corresponding to a particular multidimensional point in pose space;
   identifying one or more clusters based on a distance in pose space from the new pose to each of the one or more clusters;
   constructing an adapted basis from the one or more local bases of the one or more identified clusters;
   determining the positions of the plurality of locations on the deformable surface for the new pose using the adapted basis.

2. A method of claim 1, wherein determining the local basis of a first cluster of the plurality of clusters includes using a dimension reduction analysis and the configurations associated with the training poses of the first cluster.

3. The method of claim 2, further comprising:
   modifying the configurations associated with the training poses of the first cluster before performing the dimension reduction analysis by:
     subtracting a state of a kinematic model evaluated at the new pose, and then transforming back to a neutral pose.

4. The method of claim 1, wherein a first configuration in a local basis of one of the identified clusters is selected for inclusion in the adapted basis based on an alignment of the first configuration with a gradient of a full space dynamic model of the deformable surface.

5. The method of claim 2, wherein the dimension reduction analysis is applied to differences between the configurations and respective states of a kinematic model for the training poses.

6. The method of claim 4, wherein the gradient of the full space dynamic model of the deformable surface is selected for inclusion in the adapted basis.

7. The method of claim 1, wherein the deformable surface represents clothing.

8. The method of claim 1 wherein one of the training poses represents a shape of a three-dimensional object and the configuration of the deformable surface from the simulation at the training pose is such that part of the deformable surface is located on the surface of the three-dimensional model.

9. The method of claim 1 wherein determining the positions of the plurality of locations on the deformable surface for the new pose comprises:
   calculating a reduced system matrix K and a reduced system gradient r with respect to the adapted basis;
   solving for a reduced coordinate vector q so that Kq=r; and
   using q in determining the positions of the plurality of locations on the deformable surface.

10. The method of claim 9, wherein the reduced system matrix and the reduced system gradient are respectively determined as a projection of the full space dynamic model into a subspace spanned by the adapted basis and as a projection of the gradient of the full kinematic model into the subspace spanned by the adapted basis.

11. A computer product comprising a non-transitory computer readable medium storing a plurality of instructions that when executed control a computer system to generate animation data of deformable surface, the instructions comprising:
   receiving results of simulations of the deformable surface at a plurality of training poses, the results at a training pose comprising one or more configurations of the deformable surface, wherein a configuration specifies positions of a plurality of locations on the deformable surface;
   receiving results of clustering the training poses into a plurality of clusters, each cluster comprising one or more of the plurality of training poses, wherein the results include, for each cluster, determining one or more representative poses of the cluster, determining a local basis for a subspace of the configurations associated with the cluster based on the one or more representative poses of the cluster;

receiving a new pose corresponding to a particular multidimensional point in pose space;

identifying one or more clusters based on a distance in pose space from the new pose to each of the one or more clusters;

constructing an adapted basis from the one or more local bases of the identified clusters;

determining the positions of the plurality of locations on the deformable surface for the new pose using the adapted basis.

12. The computer product of claim 11, wherein determining the local basis of a first cluster of the plurality of clusters includes using a dimension reduction analysis and the configurations associated with the training poses of the first cluster.

13. The computer product of claim 12, further comprising:

modifying the configurations associated with the training poses of the first cluster before performing the dimension reduction analysis by:

subtracting a state of a kinematic model evaluated at the new pose, and then by transforming back to a neutral pose.

14. The computer product of claim 11, wherein a first configuration in a local basis of one of the identified clusters is selected for inclusion in the adapted basis based on an alignment of the first configuration with a gradient of a full space dynamic model of the deformable surface.

15. The computer product of claim 14, wherein the dimension reduction analysis is applied to differences between the configurations and respective states of a kinematic model for the training poses.

16. The computer product of claim 14, wherein the gradient of the full space dynamic model of the deformable surface is selected for inclusion in the adapted basis.

17. The computer product of claim 11, wherein one of the training poses represents a shape of a three-dimensional object and the configuration of the deformable surface from the simulation at the training pose is such that part of the deformable surface is located on the surface of the three-dimensional model.

18. The computer product of claim 11 wherein determining the positions of the plurality of locations on the deformable surface for the new pose comprises:

calculating a reduced system matrix K and a reduced system gradient r with respect to the adapted basis;

solving for a reduced coordinate vector q so that Kq=r; and using q in determining the positions of the plurality of locations on the deformable surface.

19. The computer product of claim 11, wherein the reduced system matrix and the reduced system gradient are respectively determined as a projection of the full space dynamic model into a subspace spanned by the adapted basis and as a projection of the gradient of the full kinematic model into the subspace spanned by the adapted basis.

20. A system comprising one or more processors communicatively linked with the computer product of claim 11 and configured to execute the plurality of instructions.

* * * * *